United States Patent [19]

Home

[11] Patent Number: 4,960,101
[45] Date of Patent: Oct. 2, 1990

[54] ASSEMBLY FOR A VARIABLE POSITION GAS BARBECUE BURNER

[75] Inventor: William Home, Taipei, Taiwan

[73] Assignee: Grand Hall Enterprise Co., Ltd., Taipei, Taiwan

[21] Appl. No.: 431,126

[22] Filed: Nov. 3, 1989

[51] Int. Cl.⁵ ............................................. F24C 3/00
[52] U.S. Cl. ................................... 126/41 R; 99/339; 431/278
[58] Field of Search ............. 126/41 R, 39 B; 99/339; 431/154, 253, 343, 356

[56] References Cited

U.S. PATENT DOCUMENTS

| 3,824,984 | 7/1974 | Swanson et al. | 431/343 X |
| 4,092,975 | 6/1978 | Grammatopoulos | 431/278 |
| 4,462,384 | 7/1984 | Hitch | 126/41 R |
| 4,561,419 | 12/1985 | Koziol | 126/39 E X |

Primary Examiner—Larry Jones
Attorney, Agent, or Firm—Varndell Legal Group

[57] ABSTRACT

An assembly for a variable position gas barbecue burner includes a burner and a prop assembly. The burner is positioned over the prop assembly such that it is raisable and lowerable with respect to the prop assembly as well as slidable across the prop assembly.

3 Claims, 3 Drawing Sheets

ASSEMBLY FOR A VARIABLE POSITION GAS BARBECUE BURNER

BACKGROUND OF THE INVENTION

This invention relates to a burner for a gas barbecue and, more particularly, to an assembly for a gas barbecue burner which allows the variability of the position of the burner within the barbecue housing.

The burner of a conventional gas barbecue has a fixed position within the barbecue housing and, as such, cannot be shifted from its original position to meet specific cooking requirements.

It is the purpose of this present invention, therefore, to provide an assembly for a burner by means of which both the horizontal and verical positions of the burner are adjustable in the manner set forth in the detailed description of the preferred embodiment.

SUMMARY OF THE INVENTION

A primary objective of this invention is to provide an assembly for a gas barbecue burner which allows the position of the burner to be shifted in both horizontal and vertical directions to meet specific cooking requirements.

Another objective of this invention is to provide an assembly for a burner that is of simple construction for ease of manufacture, assembly and disassembly.

An additional objective of this invention is to provide an assembly that is suitable to all manner of barbecue housings.

Further objectives and advantages of the present invention will become apparent as the following description proceeds, and the features of novelty which characterize the invention are pointed out with particularity in the claims annexed to and forming a part of this invention.

The assembly for a variable position gas barbecue burner essentially provides a prop assembly over which the burner is both horizontally slidable and vertically raisable. The position of the burner can therefore be shifted from its original position in the barbecue housing in order to meet specific cooking requirements. Furthermore, the assembly is easily assembled and disassembled as well as suitable to all manner of barbecue housings.

DETAILED DESCRIPTION OF THE PREFERRED EMBODIMENT

Figure 1:
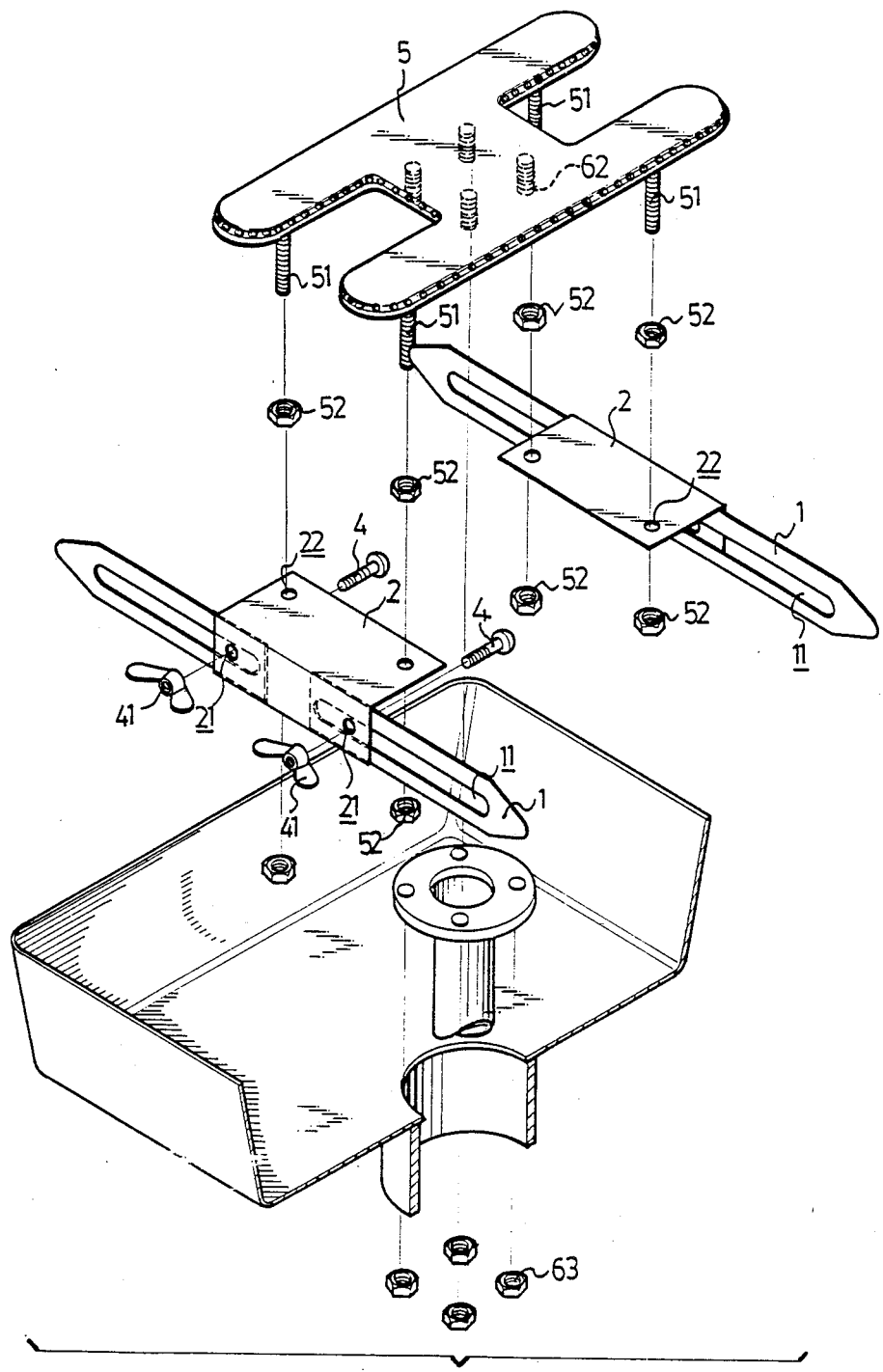
FIG. 1 is an exploded view of an assembly for a variable position gas barbecue burner in accordance with the present invention.
Figure 2:
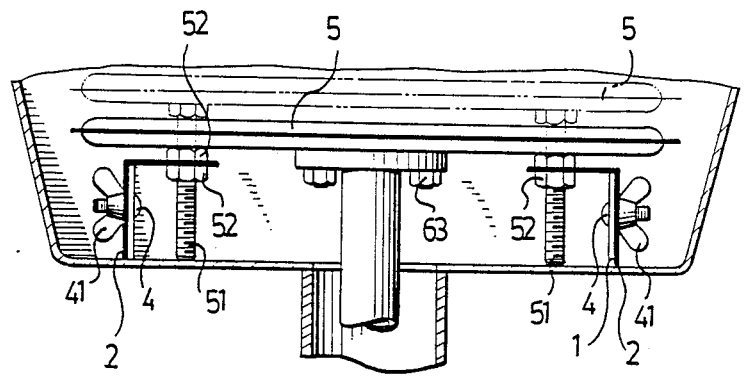
FIG. 2 is a top view of an assembly for a variable position gas barbecue burner in accordance with the present invention.
Figure 3:
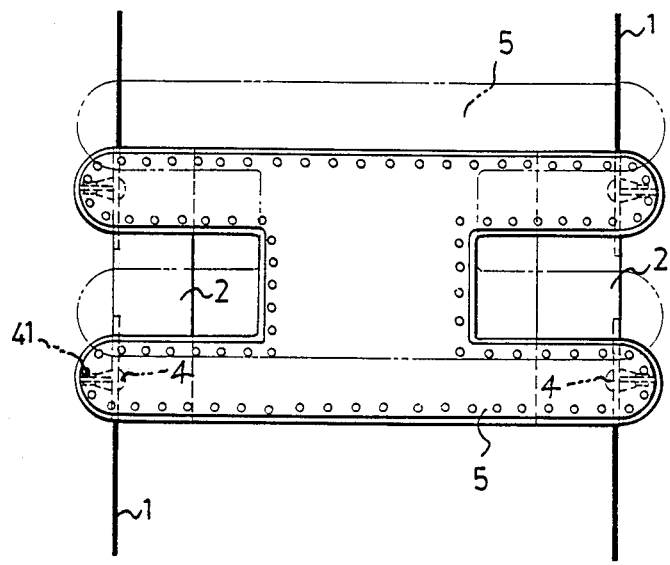
FIG. 3 is a cross-sectional view of an assembly for a variable position gas barbecue burner in accordance with the present invention.

Referring to the drawings and initially to FIG. 1, it can be seen that an assembly for a variable position gas barbecue burner in accordance with the present invention substantially comprises a burner 5, a pair of props 2, and two pair of guide blades 1.

The burner 5, to which is attached the gas pipe 6, is positioned over a prop structure. The burner 5 is slidable across the prop assembly for adjustment of horizontal positioning within the barbecue housing. The burner 5 is also raisable above the assembly for adjustment of vertical positioning.

The prop assembly basically consists of a pair of props 2 situated facing each other within the barbecue housing. Each respective horizontal face of the props 2 contains a pair of through holes 22 which correspond with respective screws 51 formed on and protruding from a bottom surface of the burner 5.

A pair of nuts 52 sandwich each respective hole 22 through which each respective screw 51 passes. By means of the synchronous rotation of the pair of nuts 52 in a certain direction, the burner 5 is raisable. The burner 5 is then lowerable by the synchronous rotation of the pair of nuts 52 in the opposite direction.

Each vertical face of the props 2 contains a respective pair of through holes 21. Each through hole, then, corresponds with a respective slot 11 of the guide blades 1. Therefore, to each respective prop 2 is attached a pair of guide blades 1 such that the guide blades 1 are pointing in an outward direction. Furthermore, screws 4 are passable through respective corresponding holes 21 and slots 11 so that the guide blades 1 and the props 2 fix together by means of the screws 4 and corresponding wing nuts 41.

The props 2 are slidable along the guide blades 1. The tightening of the wing nuts 41 against the props 2 secures the position of the props 2 with respect to the respective pair of guide blades 1. By contrast, the loosening of the wing nuts 41 enables the props 2, along with respective corresponding screws 4, to be slidable along respective slots 11. The props 2 are slidably offsettable and, therefore, so is the burner 5 which is positioned over the props 2. The burner 5 is therefore horizontally offsettable from the center of the barbecue housing to meet specific cooking requirements. Furthermore, the burner can be easily removed back to its original position.

Because the assembly is of simple design, it is easy to manufacture as well as to assemble and disassemble. Moreover, the assembly is suitable to all manner of barbecue housings. The gas pipe 6 attaches to the burner 5 by means of screws 62 and nuts 63 as in a conventional barbecue. The present invention can therefore even act as a replacement part for any convention gas barbecue burner.

As various possible embodiments might be made of the above invention without departing from the scope of the invention, it is to be understood that all matter herein described or shown in the accompanying drawing is to be interpreted as illustrative and not in a limiting sense. Thus it will be appreciated that the drawings are exemplary of a preferred embodiment of the invention.

I claim:

1. An assembly for a variable position gas barbecue burner comprising:
   a burner, on an underside of which are disposed four screws with four pairs of corresponding bolts;
   a pair of props, which are essentially bracket-shaped and are formed with vertically oriented through holes in a vertical face thereof and horizontally oriented through holes in a horizontal face thereof, said horizontally oriented through holes corresponding with respective said screws of the burner, said screws of the burner being passable through respective horizontally oriented through holes, said horizontally oriented through holes being sandwich between respective pairs of said nuts, said nuts being synchronously rotatable around said burner screws for raising and lowering said burner with respect to said horizontal faces of said props;

two pairs of guide blades with slots, said slots respectively corresponding with respective said vertically oriented through holes;

two pairs of screws with corresponding wing nuts, said screws being passable through respective said vertically oriented through holes, and, in turn, through respective said corresponding slots, such that said each respective pair of guide blade are fixable to each said corresponding prop by means of respective screws and wing nuts, and such that by tightening said wing nuts a position of said props with respect to corresponding pair of guide blades is fixable, and by loosening said wing nuts said props are slidable along respective corresponding guide blades.

2. An assembly for a variable position gas barbecue burner according to claim 1, wherein said burner is integrally formed with four evenly spaced screws on a bottom surface thereof.

3. An assembly for a variable position gas barbecue burner according to claim 1, wherein said props are situated facing each other.

* * * * *